(12) United States Patent
Lee Wang

(10) Patent No.: US 8,945,386 B2
(45) Date of Patent: Feb. 3, 2015

(54) CLEANING DEVICE OF MEMBRANE FILTRATION APPARATUS

(71) Applicant: Yung-Chuan Lee Wang, Taichung (TW)

(72) Inventor: Yung-Chuan Lee Wang, Taichung (TW)

( * ) Notice: Subject to any disclaimer, the term of this patent is extended or adjusted under 35 U.S.C. 154(b) by 30 days.

(21) Appl. No.: 13/627,145

(22) Filed: Sep. 26, 2012

(65) Prior Publication Data

US 2013/0075322 A1 Mar. 28, 2013

(30) Foreign Application Priority Data

Sep. 27, 2011 (TW) .............................. 100134871 A

(51) Int. Cl.
| | |
|---|---|
| *B01D 65/04* | (2006.01) |
| *B01D 65/02* | (2006.01) |
| *B01D 61/20* | (2006.01) |
| *C02F 3/12* | (2006.01) |

(52) U.S. Cl.
CPC ................ *B01D 65/02* (2013.01); *B01D 61/20* (2013.01); *B01D 2311/2688* (2013.01); *B01D 2315/06* (2013.01); *B01D 2313/26* (2013.01); *B01D 2321/185* (2013.01); *B01D 2321/2091* (2013.01); *B01D 2321/30* (2013.01); *C02F 3/1273* (2013.01); *C02F 2303/16* (2013.01)
USPC .............. 210/321.7; 210/321.75; 210/321.84; 210/334; 210/408; 210/413

(58) Field of Classification Search
CPC ........... B01D 2313/26; B01D 2315/06; B01D 2321/185; B01D 2321/2091; B01D 2321/30; B01D 2329/38; B01D 65/02; B01D 65/04; B01D 29/0077; B01D 29/6407; B01D 29/6423; B01D 29/6469; B01D 29/6484; B01D 2311/30; C02F 2303/16; C02F 3/1273

USPC .............. 210/636, 649–654, 321.75, 321.84, 210/332, 353, 355, 407, 408, 413; 165/94, 165/95; 15/50.2, 54, 77, 78, 88
See application file for complete search history.

(56) References Cited

U.S. PATENT DOCUMENTS

| | | | | |
|---|---|---|---|---|
| 2,233,066 | A | * | 2/1941 | Watson ........................... 165/95 |
| 4,315,541 | A | * | 2/1982 | Murata et al. ................... 165/94 |
| 4,664,180 | A | * | 5/1987 | Stevenson ....................... 165/94 |

(Continued)

FOREIGN PATENT DOCUMENTS

JP 09-057071 * 4/1997

OTHER PUBLICATIONS

English language machine translation of JP09057071, pp. 1-6.*

(Continued)

*Primary Examiner* — David C Mellon
*Assistant Examiner* — Pranav Patel
(74) *Attorney, Agent, or Firm* — Ming Chow; Sinorica, LLC

(57) ABSTRACT

A membrane filtration apparatus includes a frame, in which a plurality of membrane members, an aeration device, a cleaning device, and a jet device are provided. The cleaning device includes a rail mounted on the frame; an up frame engaging the rail to be moved in the rail, a plurality of cleaning wires respectively having an end connected to the up frame and respectively passing through a space between each two of the neighboring membrane members; and a low frame connected to opposite ends of the cleaning wires. A motor is provided to move the up frame so that the cleaning wires are reciprocating in the space to scratch the sludge off the membrane members.

9 Claims, 11 Drawing Sheets

(56) References Cited

U.S. PATENT DOCUMENTS

| | | | |
|---|---|---|---|
| 4,825,940 A * | 5/1989 | Barroyer et al. | 165/84 |
| 4,859,332 A * | 8/1989 | Johnson | 210/332 |
| 2003/0121855 A1* | 7/2003 | Kopp | 210/650 |
| 2008/0105605 A1* | 5/2008 | Kobayashi | 210/209 |
| 2011/0163025 A1* | 7/2011 | Ishikawa et al. | 210/321.84 |

OTHER PUBLICATIONS

English language machine translation of JP09-057071, pp. 1-6, No Date.*

* cited by examiner

CLEANING DEVICE OF MEMBRANE FILTRATION APPARATUS

BACKGROUND OF THE INVENTION

1. Field of the Invention

The present invention relates generally to water treatment, and more particularly to a membrane filtration apparatus which is equipped with a cleaning device to clean the membranes thereof.

2. Description of the Related Art

Water is one of the essential elements to maintain life, and it is indispensable to the modern industry also. The demand of industrial water is much higher than ever, so that the pollution prevention and reuse of industrial wastewater becomes more and more important.

In the past time, the industrial wastewater should be properly treated before discharge. The treatments process units include aeration, sedimentation, filtration, chemical coagulation, activated carbon treatment, and biological treatment, etc. The governments have many regulations to limit the industrial wastewater discharge, in order to reduce environmental impact.

Recently, due to the extreme climate, water exhaustion condition is getting worse, so that the shortage of water resource becomes a serious problem. Therefore, how to recycle the industrial water is a new issue in the modern wastewater treatment.

Membrane bioreactor (MBR) is a new developed technique of wastewater treatment in the present days, and it is an optimal process for wastewater reuse. MBR is the combination of a membrane process, like microfiltration or ultrafiltration, with a suspended growth bioreactor. It provides micropores on the membrane to restrict activated sludge of aerobic or anaerobic system in the reactor. Typically, MBR is applied in the secondary biological treatment, and it has the performance of the tertiary treatment because of its combination of membrane and biological process.

FIG. 1 shows a membrane filtration module 104 of a MBR system, which includes a frame 106, which is divided into an aeration area at a low section and a membrane area at an up section, an aeration device 108 mounted in the aeration area of the frame 106, and a plurality of membrane members 116 mounted in the membrane area of the frame 106. The aeration device 108 includes a main pipe 110 and several branch pipes 112. Each branch pipe 112 is provided with several apertures 114. An air blower (not shown) is connected to the main pipe 110 to provide compressed air, and the compressed air will go out of the aeration device 108 via the apertures 114. Each membrane member 116 is connected to a permeate pipe 118 and a common water pipe 120. As shown in FIG. 2, the membrane member 116 has a frame board 122, to opposite sides of which membranes 124 are attached. The frame board 122 is hollow and has an outlet 126 on a top thereof. The permeate pipe 118 is connected to the outlet 126.

Typically, a plurality of the membrane filtration apparatuses 104 are mounted in a sewage tank (not shown). Sewage flows into the membrane members 116 through the membranes 124 and is filtered through the micropores on the membranes. The permeated clean water flows into the common water pipe 120 through the outlets 126 of the frame boards 122 and the permeate pipes 118 for the next process.

Inevitably, there is sludge attached to the membranes 124 after the sewage flows there through. The aeration device 108 provides air bubbles to remove the sludge from the membranes 124. Theoretically, the sludge should be removed by the air bubbles. However, a crosslink reaction may happen in the sludge and the product is very hard to remove. Besides, the interval spaces between the membrane members 116 are very narrow (about 8 mm) so that they are very easy to be jammed by the sludge after a time of operation. Therefore, the operator has to add a cleaning solution into the membrane filtration apparatuses 104 to periodically remove the sludge, and sometimes it even has to take the membrane members 116 out of the frame 106 to wash the membranes 124 directly.

SUMMARY OF THE INVENTION

The primary objective of the present invention is to provide a membrane filtration apparatus with a cleaning device to remove the sludge on the membranes, even the crosslinked sludge.

According to the objective of the present invention, the present invention provides a cleaning device of a membrane filtration apparatus. The membrane filtration apparatus includes a frame and a plurality of membrane members mounted in the frame in parallel, and each of the membrane members includes a base board and two membranes attached to the opposite sides of the base board. The cleaning device includes a rail mounted on the frame; an up frame engaging the rail to be moved in the rail; a plurality of cleaning wires respectively having an end connected to the up frame and respectively passing through a space between two of the neighboring membrane members; and a low frame connected to opposite ends of the cleaning wires. Therefore, the cleaning wires move along with the up frame to clean the membranes.

The cleaning wires may scratch the sludge, even the crosslinked sludge, off the membrane members.

DETAILED DESCRIPTION OF THE INVENTION

The detailed description and technical contents of the present invention will be explained with reference to the accompanying drawings. However, the drawings are illustrative only but not used to limit the present invention.

Figure 1:
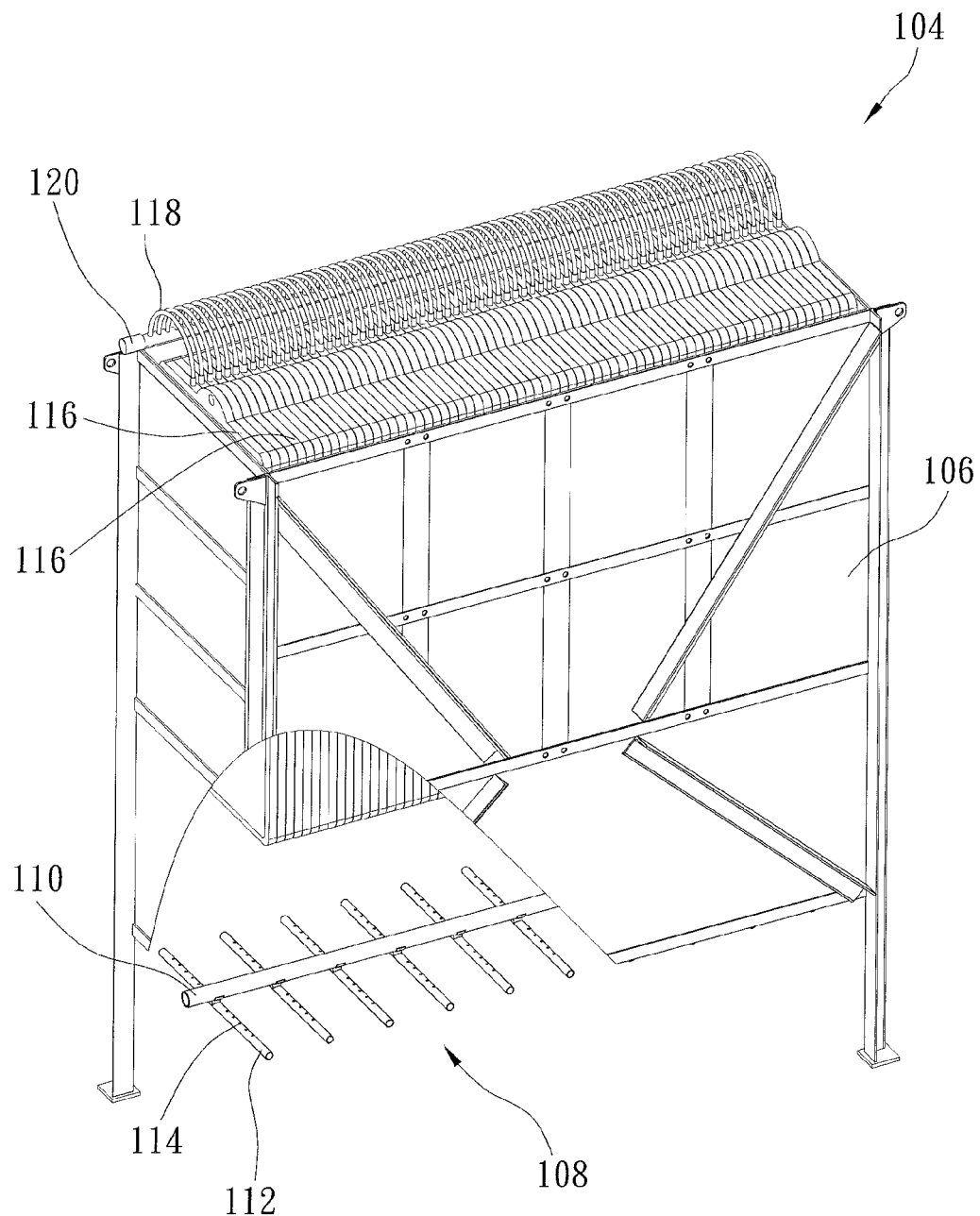
FIG. 1 is a perspective view of the conventional membrane filtration apparatus.
Figure 2:
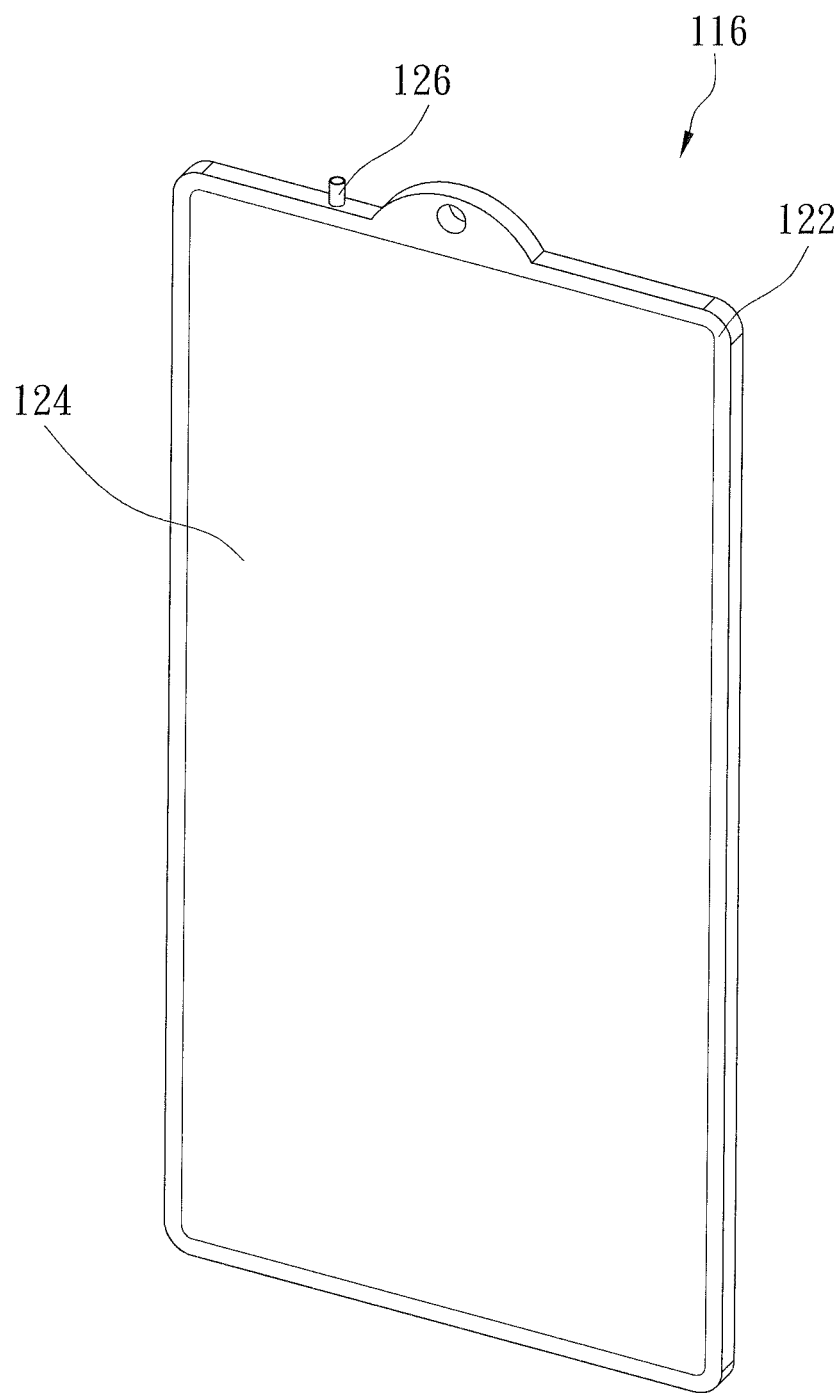
FIG. 2 is a perspective view of the conventional membrane member.
Figure 3:
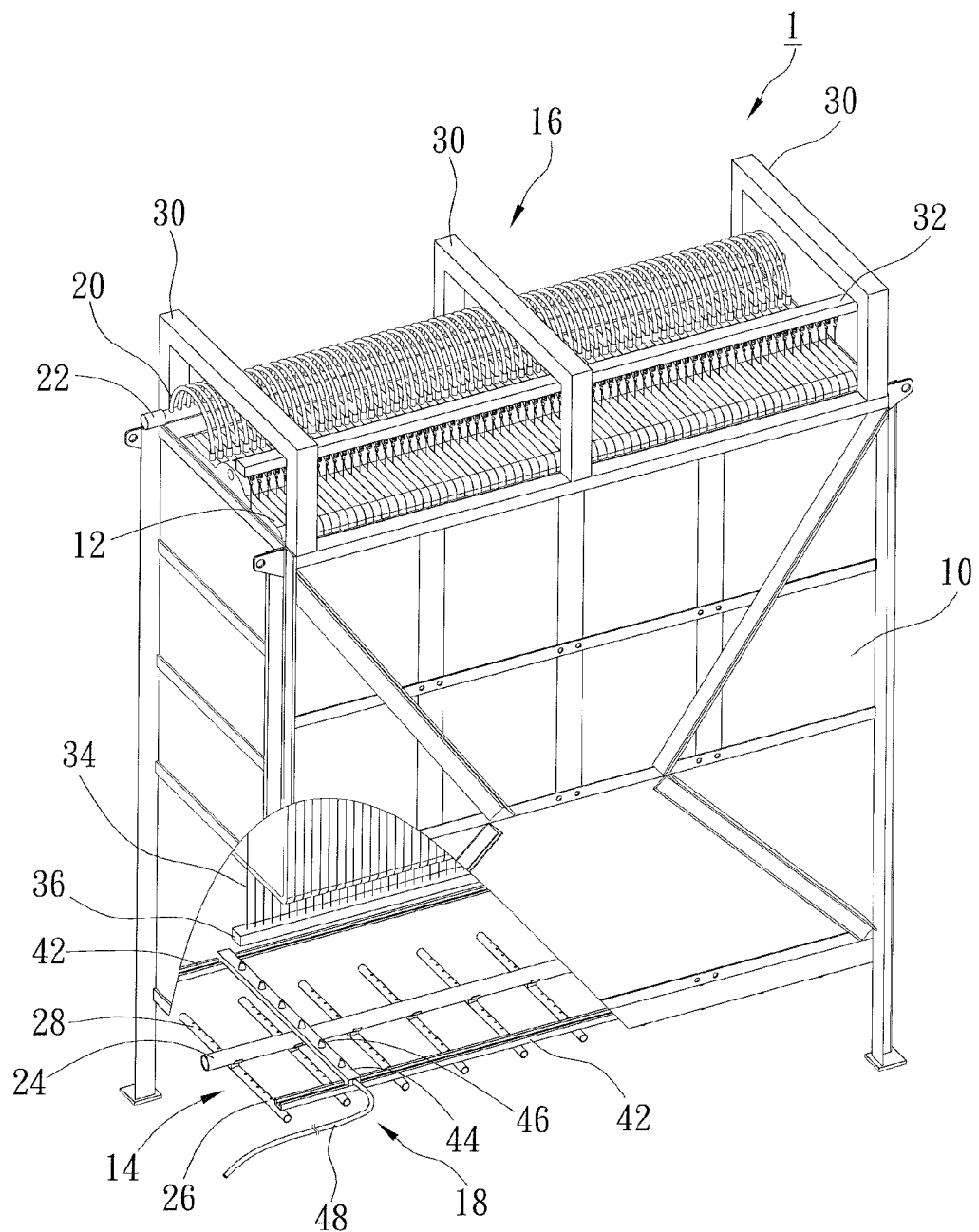
FIG. 3 is a perspective view of the membrane filtration apparatus of a preferred embodiment of the present invention.

As shown in FIG. 3, a membrane filtration apparatus 1 of the preferred embodiment of the present invention mainly includes a frame 10, in which a plurality of membrane members 12, an aeration device 14, a cleaning device 16, and a jet device 18 are provided. The aeration device 14, the cleaning device 16 and the jet device 18 are used to remove the sludge in the present invention.

The frame 10 is the same as the conventional device, so we do not describe the detail again. The membrane members 12, which are the same as the conventional device, respectively have a hollow base board and two membranes attached to the opposite sides of the base board. There are membranes pads (not shown) under the membranes. The base board has an outlet at a top thereof. Each membrane 12 is connected to a water pipe 22 through a tube 20. The tube 20 connects to the outlet. The frame 10 is put in a sewage tank (not shown). Sewage flows into the membrane members 12 through the membranes and is filtered. The clean water flows to the common water pipe 22 through the outlets of the frame boards and the pipes for the next process. The function of the frame 10 and the membrane members 12 are the same as the conventional device, so we do not describe the detail again.

The aeration device 14, which is the same as the conventional device, is under the membrane members 12. The aeration device 14 has a main air pipe 24 and a plurality of branch air pipes 26. The branch air pipes 26 are connected to the main air pipe 24 and have apertures 28. The main air pipe 24 is connected to an air blower (not shown) to supply compressed air. The compressed airs goes through the main air pipe 24 and the branch air pipes 26, and finally go out via the apertures 28.

Figure 4:
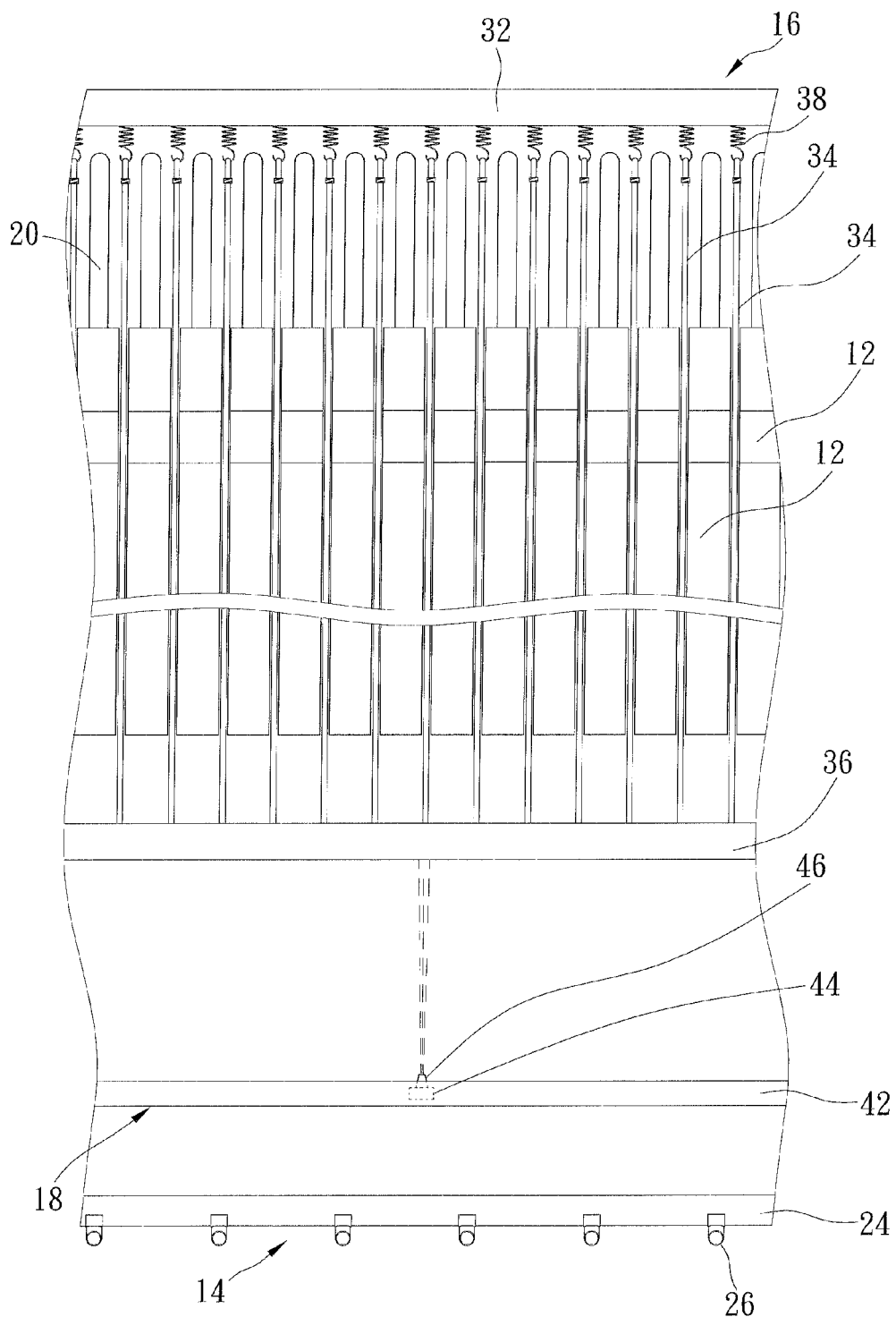
FIG. 4 is a sectional view of the membrane filtration apparatus of the preferred embodiment of the present invention.

The cleaning device 16 has a plurality of rails 30 and a cleaning set. The rails 30 are mounted on the frame 10 and are above the membrane members 12. The rails 30 are parallel to the membrane members 12. The cleaning set has an up frame 32, a plurality of cleaning wires 34 and a low frame 36. The up frame 32 engages the rails 30 to move in the rails 30. The up frame 32 and the low frame 36 are parallel and are perpendicular to the rails 30. Lengths of the up frame 32 and the low frame 36 is longer than a total width of all the membrane members 12. The up frame 32 is above the membrane members 12, and the low frame 36 is under the membrane members 12. As shown in FIG. 4, opposite ends of the cleaning wires 34 are connected to the up frame 32 and the low frame 36, and each cleaning wire 34 respectively passes through a space between each two neighboring membrane members 12. The low frame 36 is hung by the cleaning wires 34, and therefore the low frame 36 is suspended.

Figure 5:
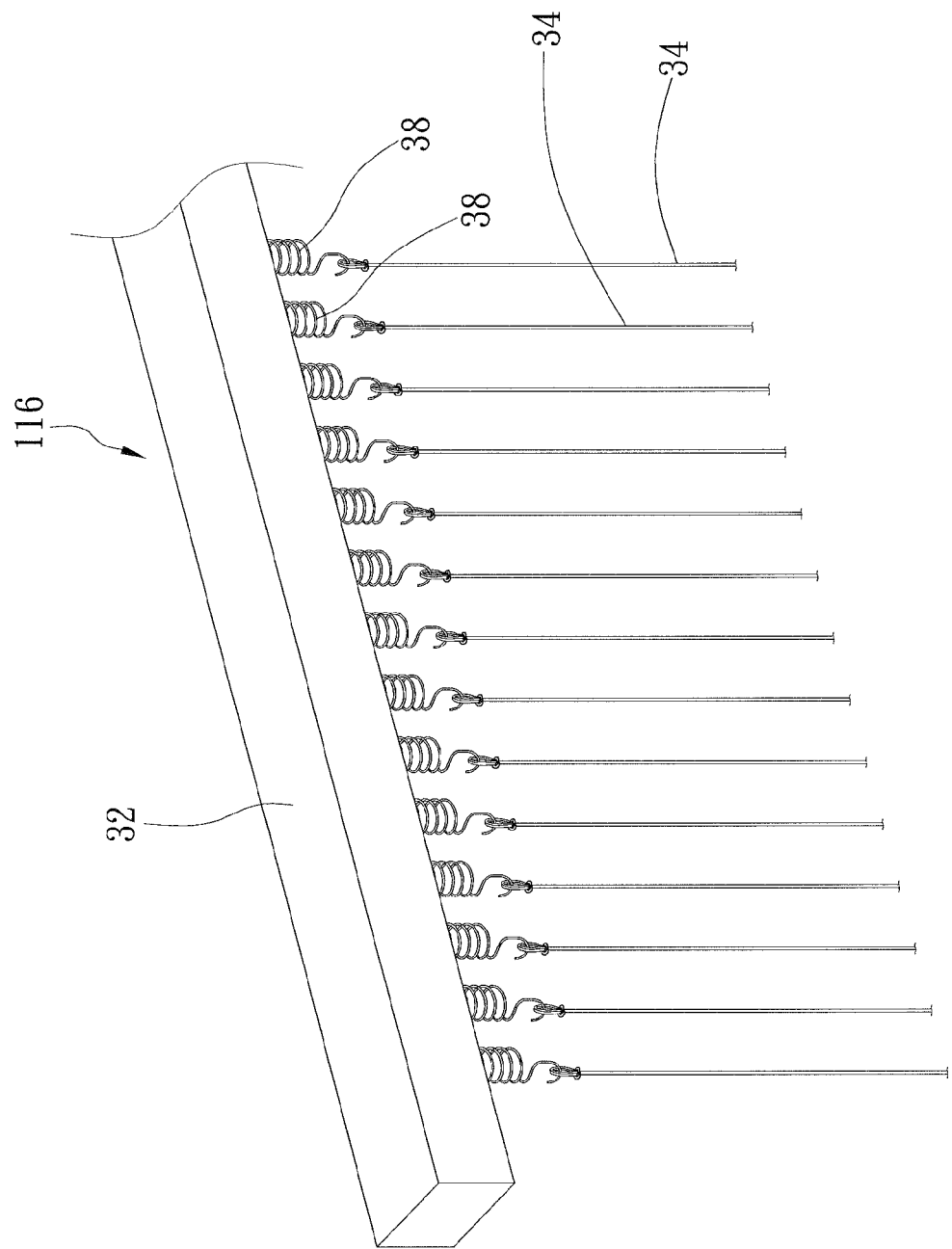
FIG. 5 is a perspective view of the cleaning device of the preferred embodiment of the present invention.

As shown in FIG. 5, a tension adjustor 38 is provided on the up frame 32 to adjust tensions of the cleaning wires 34. In an embodiment, the tension adjustor 38 has springs respectively connected to the cleaning wires 34. The weight of the low frame 36 pulls the cleaning wires 34 as well as the springs to let the cleaning wires 34 having a predetermined tension. After a time of operation, the cleaning wires 34 may have material fatigue, the springs may compensate the tension loss to keep the tensions of the cleaning wires 34.

The up frame 32 is driven by a driving means, such as a motor, to reciprocate the cleaning wires 34 in the spaces between the membrane members 12. It will make the cleaning wires 34 to scratch the sludge off the membranes of the membrane members 12. Furthermore, the suspended low frame 36 will be agitated by the air bubbles of the aeration device 14 and the water jets of the jet device 18, so that the cleaning wires 34 will be randomly shaken or vibrated when they are reciprocating. It will enhance the cleaning performance. With the cleaning device 16 it will easily remove the sludge off the membranes of the membrane members 12, even crosslinked sludge.

Figure 7:
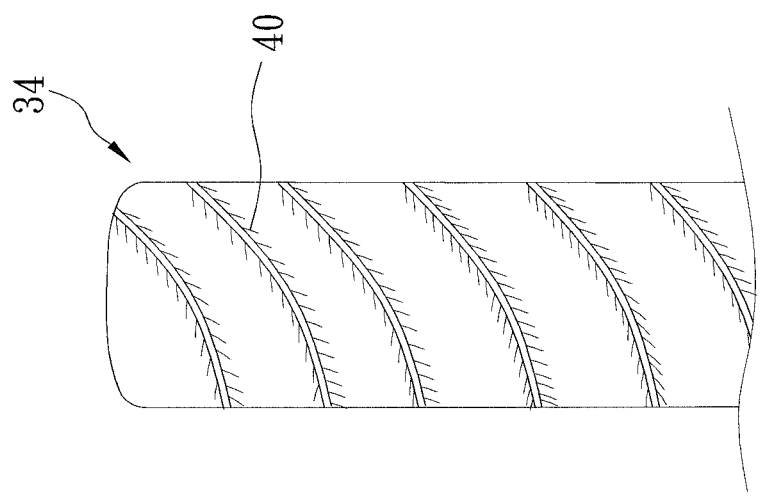
FIG. 7 is a perspective view of another cleaning wire of the preferred embodiment of the present invention.
Figure 6:
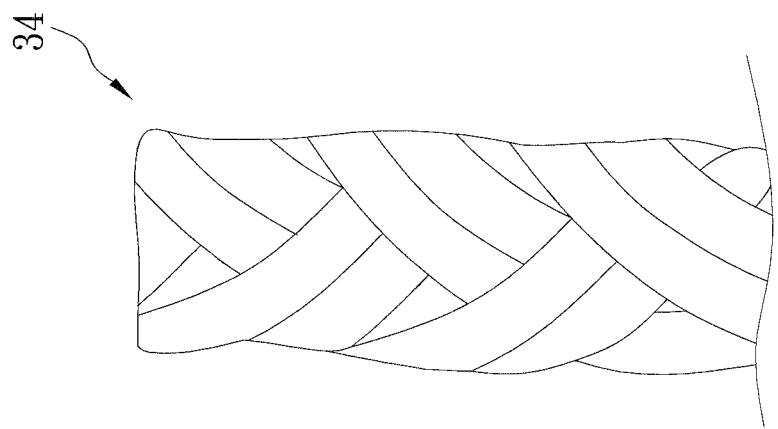
FIG. 6 is a perspective view of the cleaning wire of the preferred embodiment of the present invention.

In an embodiment, the cleaning wires 34 may be nylon wires, carbon fiber wires, cotton wires, or microfiber wires. The cleaning wires 34 may have a smooth surface or a rough surface. FIG. 6 shows a weaved cleaning wire 34 so that it inherently has a rough surface. FIG. 7 shows a cleaning wire 34' with hairs 40 on a surface thereof. Theoretically, the cleaning wire 34 with a rough surface may have better cleaning performance.

Figure 8:
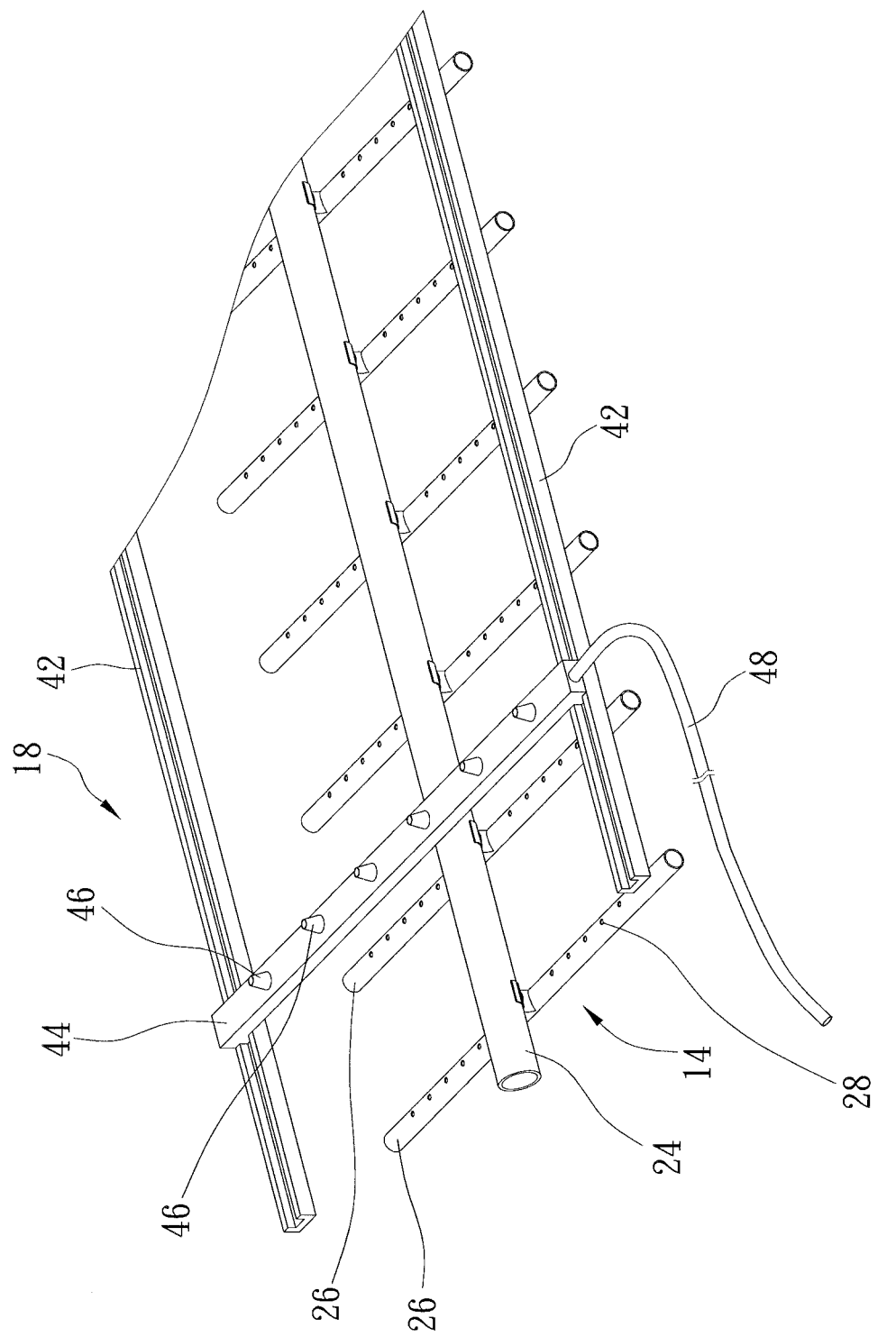
FIG. 8 is a perspective view of the aeration device and the jet device of the preferred embodiment of the present invention.

As shown in FIG. 8, the jet device 18 is mounted in the frame 10 and is under the aeration device 14. The jet device 18 has rails 42, a jet pipe 44, and a hose 48. The jet pipe 44 has a plurality of nuzzles 46. The jet pipe 44 engages the rails 42 to move in the rails 42. The hose 48 is connected to the jet pipe 44. A compressor (not shown) is connected to the hose 48 to supply compressed water so that water jets will be coming out of the nuzzles 46 to wash the membrane members 12. The jet pipe 44 is moved by a driving means (not shown), such as a motor, to move in the rails 42 so that the water jets may cover all the membrane members 12. The hose 48 is flexible and has a sufficient length for the jet pipe 44 to move.

The water jets provided by the jet device 18 and the air bubbles provided by the aeration device 14 will have an interaction in removal of the sludge on the membrane members 12. The reasons of why the jet device 18 working with the aeration device 14 may provide a better performance in cleaning the membrane members 12 are:

1. The water jet may speed up the air bubbles so that the distance between the aeration device 14 and the membrane members 12 may be shortened. In other words, the height of the frame 10 is shorter than the conventional frame. We assume that the acceleration of the air bubble is a, so that there must be a sufficient distance for the air bubble to speed up to a sufficient speed v to clean up the membrane members 12. However, the water jet may reduce the resistance of the air bubbles to move in water and help the air bubbles to speed up. Therefore, it may have a better cleaning performance even there is shorter distance between the aeration device 14 and the membrane members 12.

2. The interaction of the water jets and the air bubbles may increase the shear force which is exerted on the sludge, therefore the sludge will be easier to be removed.

The way of moving the jet pipe 44 may be 1) periodically moving the jet pipe 44 for one time or several times; 2) moving the jet pipe 44 in a constant speed; and 3) moving the jet pipe 44 in a specific condition, such as the pressure in the membrane members 12 is higher than a predetermined value, which indicates that the membrane members 12 are going to be jammed.

Figure 9:
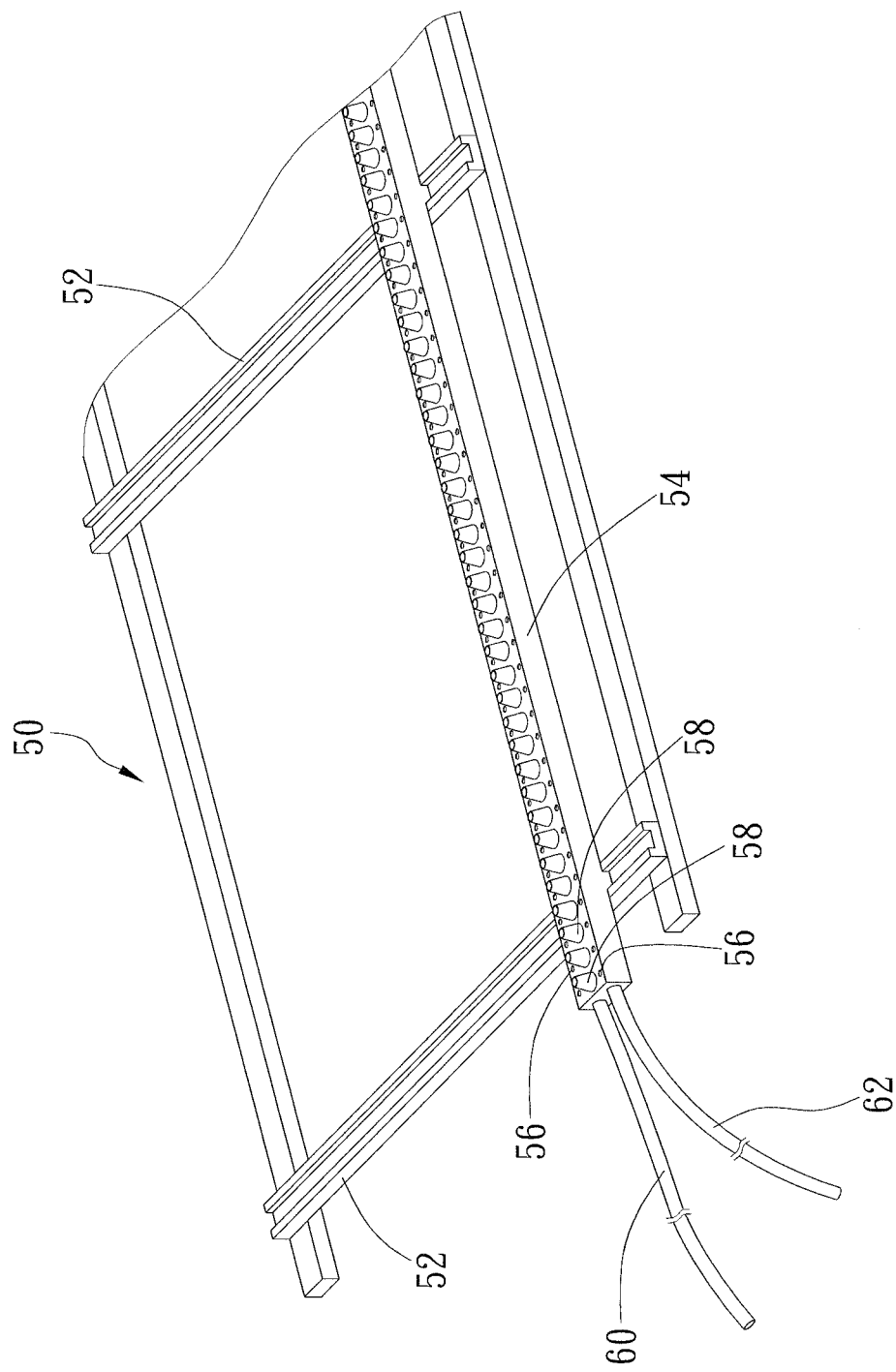
FIG. 9 is a perspective view of the first design of the combined aeration and jet device of the first design of the preferred embodiment of the present invention.

FIG. 9 shows an integrated device 50 of the aeration device and the jet device, which includes rails 52 and a base 54. An air pipe and a jet pipe are mounted in the base 54, and an air hose 60 and a water hose 62 respectively connect to the air pipe and the jet pipe. On the base 54 is provided with a plurality of apertures 56 and nuzzles 58. The apertures 56 and the nuzzles 58 are respectively connected to the air pipe and the jet pipe to provide air bubbles and water jets.

The base 54 moves on the rails 52 to let the air bubbles and the water jets to wash all the membrane members. The need of power may be greatly reduced because of fewer apertures of the aeration device.

The number of the apertures and the nuzzles may be change according to different requirements. In general, it is preferable to have more apertures than the nuzzles, and more preferable ratio of apertures to nuzzles is 2:1.

The aeration device and the jet device may be both movable, both fixed, or one movable and the other fixed. The direction of the movement of the aeration device and the jet device may be parallel to the membrane members (as shown in FIG. 9) or perpendicular to the membrane members (as shown in FIG. 3). The other way of movement is bi-directional, which means that the aeration/jet device move in the direction of parallel to the membrane members, and then move in the direction of perpendicular to the membrane members, and repeat the above movements until all the membrane members are washed. In this kind of movement, it only needs the aeration/jet device with half length, one third length, or shorter.

Figure 10:
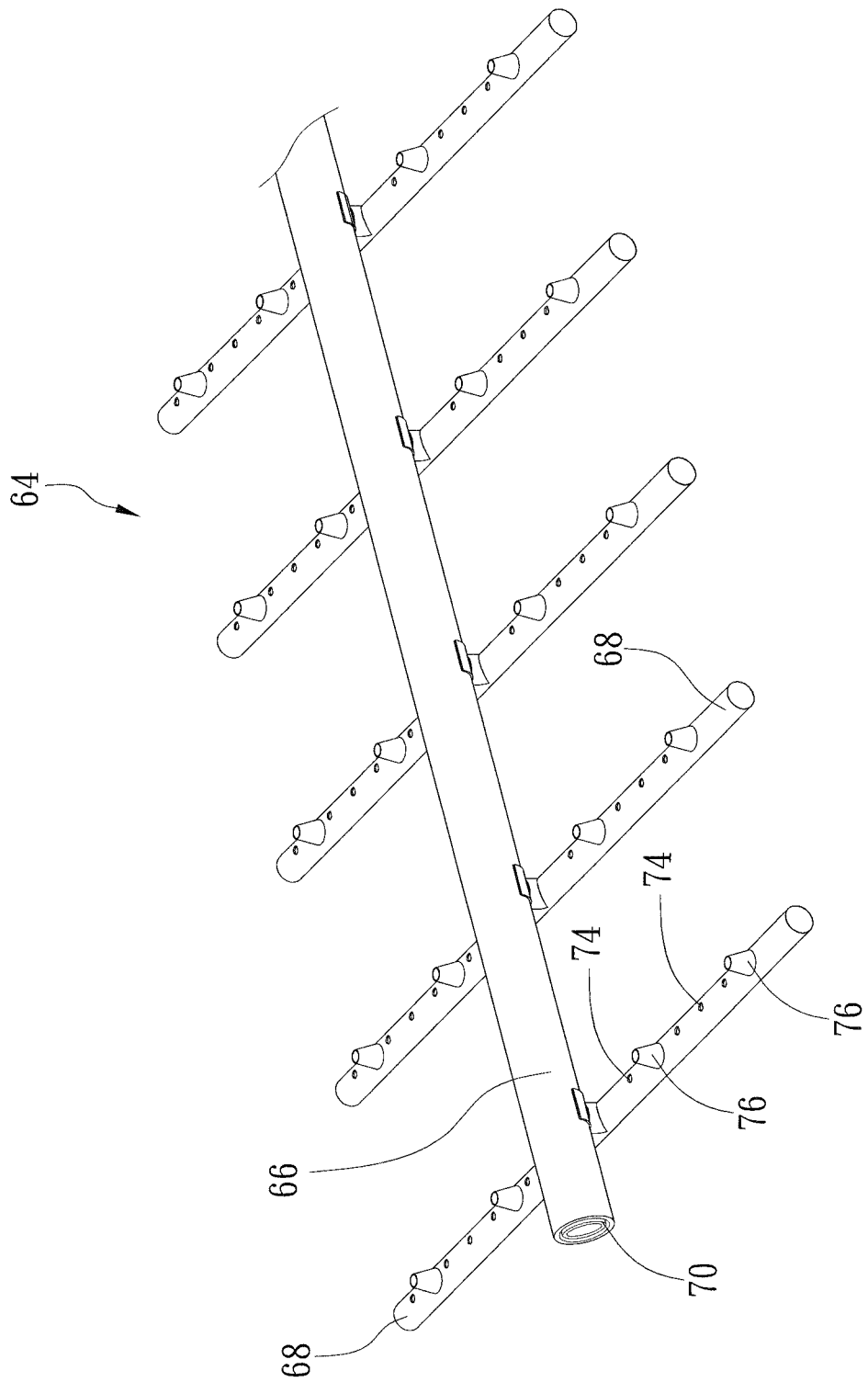
FIG. 10 is a perspective view of the second design of the combined aeration and jet device of the first design of the preferred embodiment of the present invention.
Figure 11:
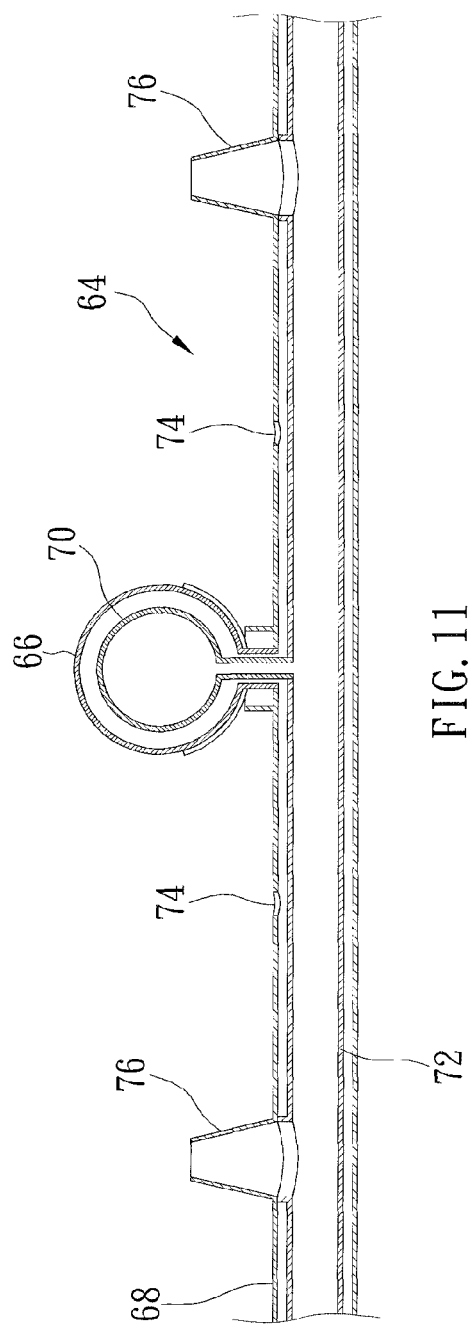
FIG. 11 is a sectional view of FIG. 10.

FIG. 10 shows the second kind of integrated device 64 of the aeration device and the jet device, which has a main air pipe 66, several branch air pipes 68 connected to the main air pipe 66, a main water pipe 70, and several branch water pipes 72 connected to the main water pipe 70. As shown in FIG. 11, the main water pipe 70 and the branch water pipes 72 are respectively received in the main air pipe 66 and the branch air pipes 68. Each branch air pipe 68 is alternately provided with apertures 74 and nuzzles 76. The nuzzles 76 are connected to the branch water pipe 72 through tubes. Therefore, compressed air goes through the main air pipe 66 and the branch air pipes 68 so that air bubbles come out via the apertures 74 and compressed water goes through the main water pipe 70 and the branch water pipes 72 so that water jets come out via the nuzzles 76.

Figure 12:
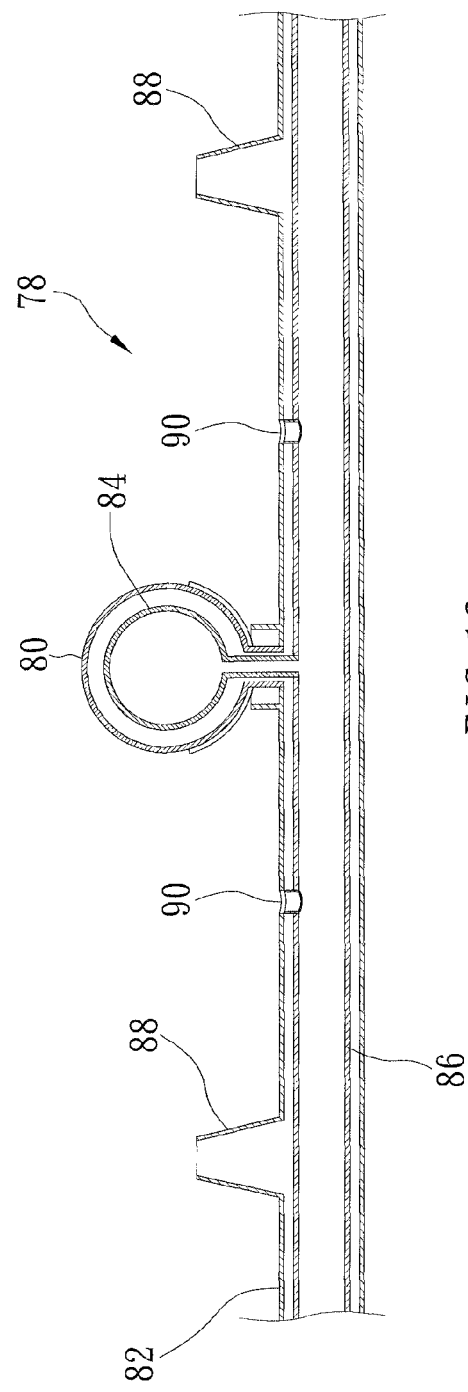
FIG. 12 is a sectional view of the third design of the combined aeration and jet device of the first design of the preferred embodiment of the present invention.
Figure 14:
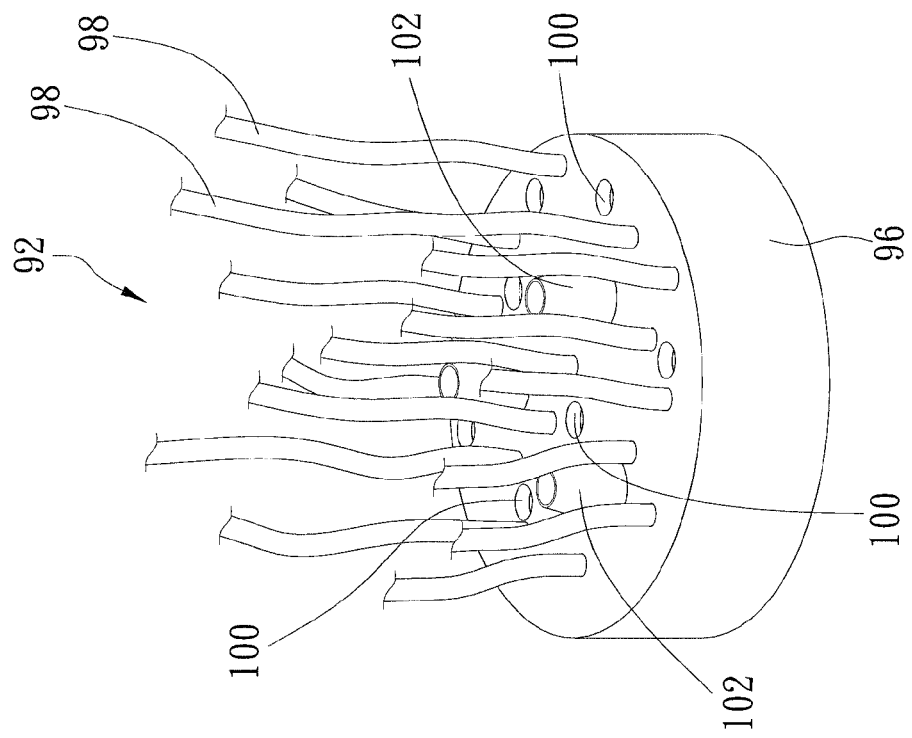
FIG. 14 is a perspective view of the base of the membrane filtration apparatus of the preferred embodiment of the present invention, showing the aeration device and the jet device.

FIG. 12 shows the third kind of integrated device 78 of the aeration device and the jet device, which is an opposite design of the integrated device 64. In other words, the main air pipe 84 and the branch air pipes 86 are received in the main water pipe 80 and the branch water pipes 82, and the apertures 90 and the nuzzles 88 are provided on the branch water pipes 82 to provide air bubbles and water jets. The function of the third integrated device 78 is the same as above, so we do not describe it again.

Figure 13:
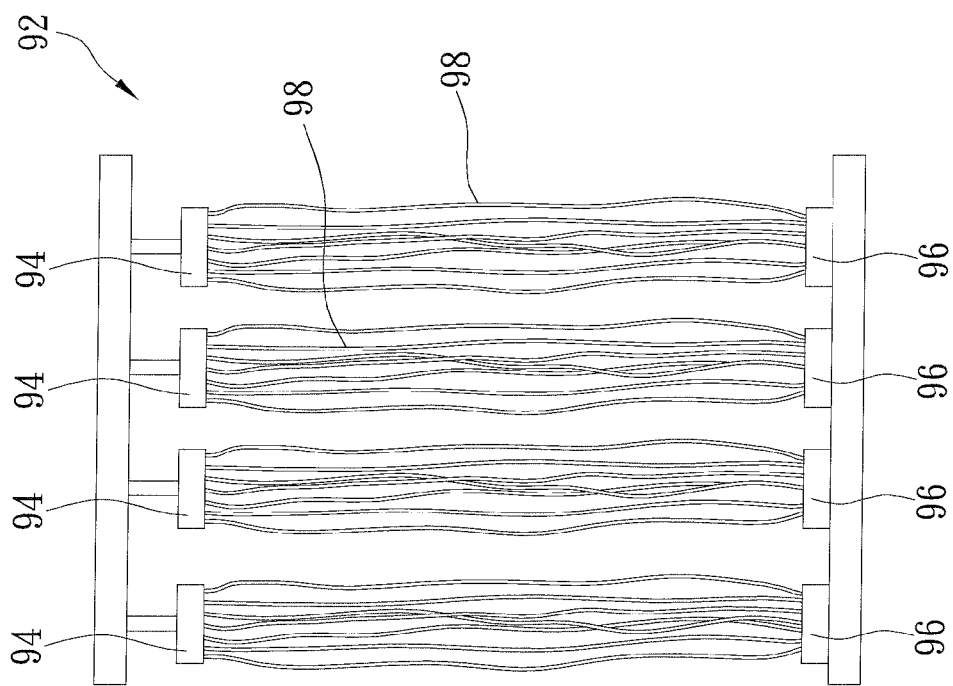
FIG. 13 is a perspective view of another membrane filtration apparatus of the preferred embodiment of the present invention.

FIG. 13 shows another membrane member 92, which has two bases 94, 96 and a plurality of long tubular membranes 98 with opposite ends connected to the bases 94, 96. The aeration device and the jet device are provided in the bottom base 96. It only shows apertures 100 of the aeration device and nuzzles 102 of the jet device are provided on the base 96. The apertures 100 and the nuzzles 102 are alternately arranged on the base 96 among the membranes 98 to provide air bubbles and water jets.

The cleaning device, the aeration device and the jet device of the present invention may remove the sludge on the membrane members, even crosslinked sludge. Cleaning device, the aeration device and the jet device may work alone or work together, according to the user's need.

The description above is a few preferred embodiments of the present invention, and the equivalence of the present invention is still in the scope of claim construction of the present invention.

What is claimed is:

1. A cleaning device of a membrane filtration apparatus, wherein the membrane filtration apparatus includes a frame and a plurality of membrane members mounted in the frame in parallel, and each of the membrane members includes at least one membrane, the cleaning device comprising:
   a rail mounted on the frame;
   an up frame engaging the rail, and the up frame being driven to be moved on the rail;
   a plurality of cleaning wires, each respectively having an end connected to the up frame, and each respectively passing through a space between each two of the membrane members;
   a low frame connected to opposite ends of the cleaning wires; and
   an aeration device mounted on the frame, wherein the aeration device has a plurality of apertures to provide air bubbles;
   wherein the up frame is vertically above the membrane members, and the low frame and the aeration device are vertically under the membrane members;
   wherein the rail is parallel to the membrane members, and the up frame is perpendicular to the rail, so that the cleaning wires reciprocate in the spaces between the membrane members in a horizontal direction when the up frame is reciprocating on the rail;
   wherein the low frame is between the membrane members and the aeration device, and the low frame and the cleaning wires are agitated by the air bubbles of the aeration device.

2. The cleaning device of the membrane filtration apparatus as defined in claim 1, further comprising a tension adjustor connected to the cleaning wires to adjust tensions of the cleaning wires, and compensate a tension loss of the cleaning wires when the cleaning wires have material fatigue, wherein the tension adjustor is not in the spaces between the membrane members.

3. The cleaning device of the membrane filtration apparatus as defined in claim 2, wherein the tension adjustor has a plurality of springs, each of which has an end connected to the up frame and an opposite end connected to the cleaning wire.

4. The cleaning device of the membrane filtration apparatus as defined in claim 1, wherein the cleaning wire has a smooth surface.

5. The cleaning device of the membrane filtration apparatus as defined in claim 1, wherein the cleaning wire has a rough surface.

6. The cleaning device of the membrane filtration apparatus as defined in claim 1, wherein the cleaning wire has hairs on a surface thereof.

7. The cleaning device of the membrane filtration apparatus as defined in claim 1, wherein the cleaning wire is a composite wire, a cotton wire, or a microfiber wire.

8. The cleaning device of the membrane filtration apparatus as defined in claim 1, further comprising a jet device mounted in the frame, wherein the jet device has a jet pipe and at least a nozzle on the jet pipe to provide water jet to the membrane members.

9. The cleaning device of the membrane filtration apparatus as defined in claim 8, wherein the aeration device has an air pipe and the jet device has a water pipe; the air pipe is received in the water pipe; the apertures and the nozzles are provided on the water pipe; and the apertures are connected to the air water pipe through tubes; the air pipe has openings, and the tubes are received in the water pipe, and have opposite ends connected to the openings of the air pipe and the apertures of the water pipe, so that the air bubbles come out from the apertures.

* * * * *